May 20, 1930.  T. J. WHETSTONE  1,759,770
POULTRY TRAP
Filed May 28, 1928  3 Sheets-Sheet 1
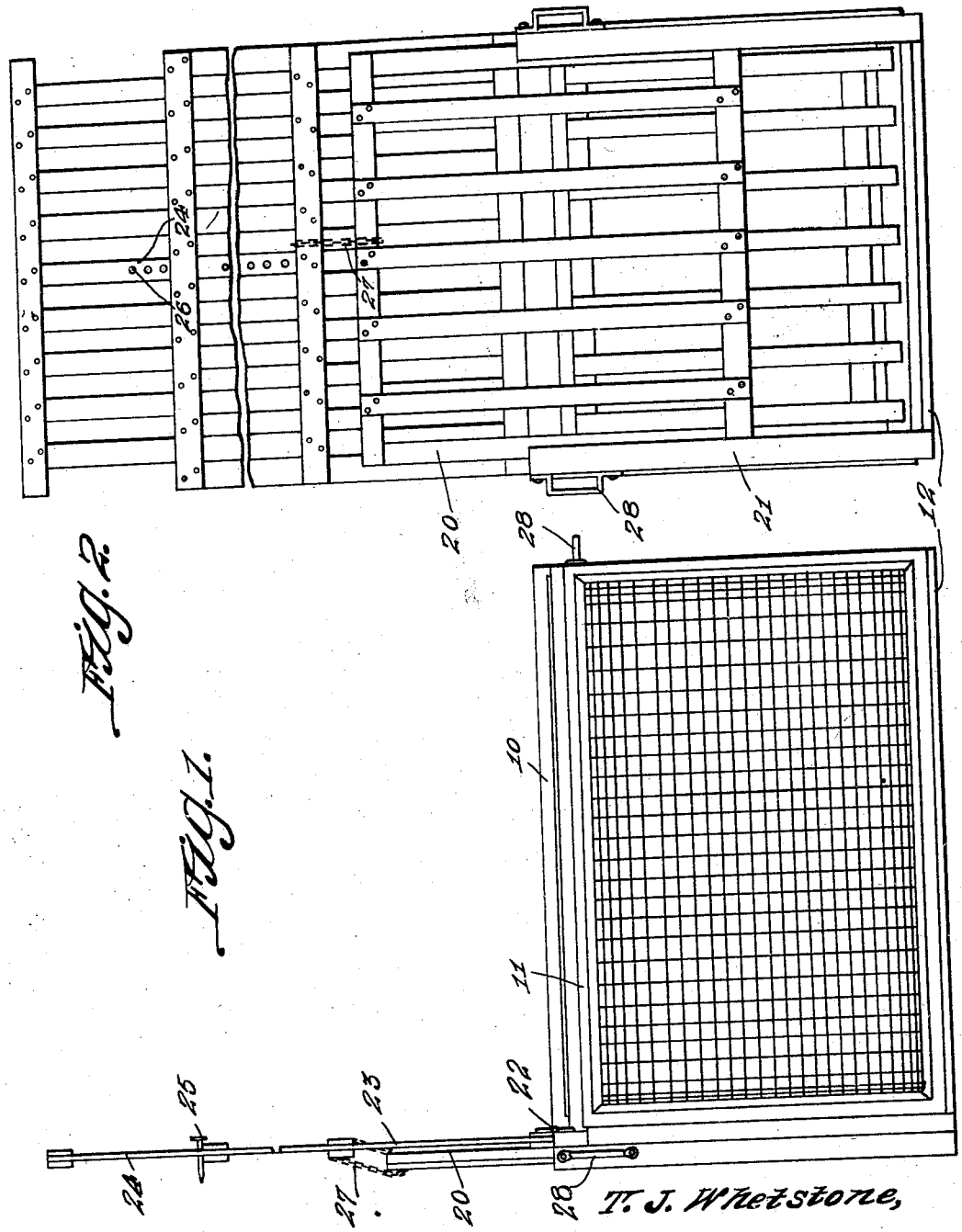
INVENTOR
T. J. Whetstone,
BY Victor J. Evans
ATTORNEY

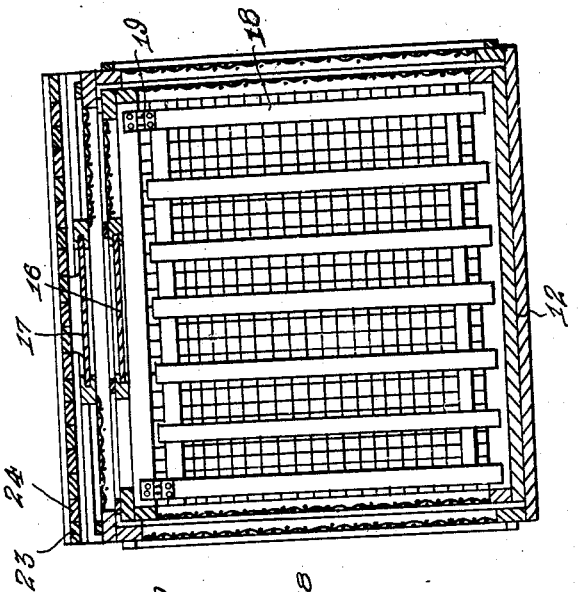
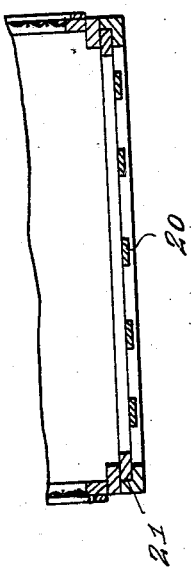
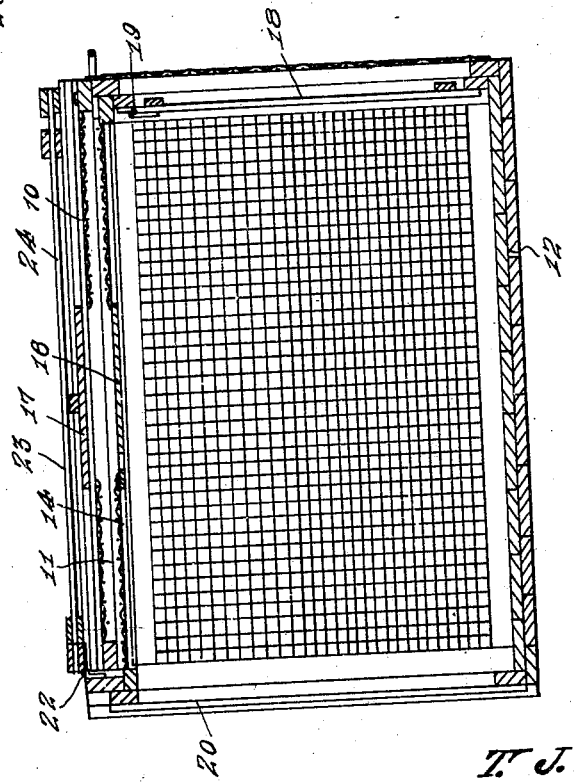

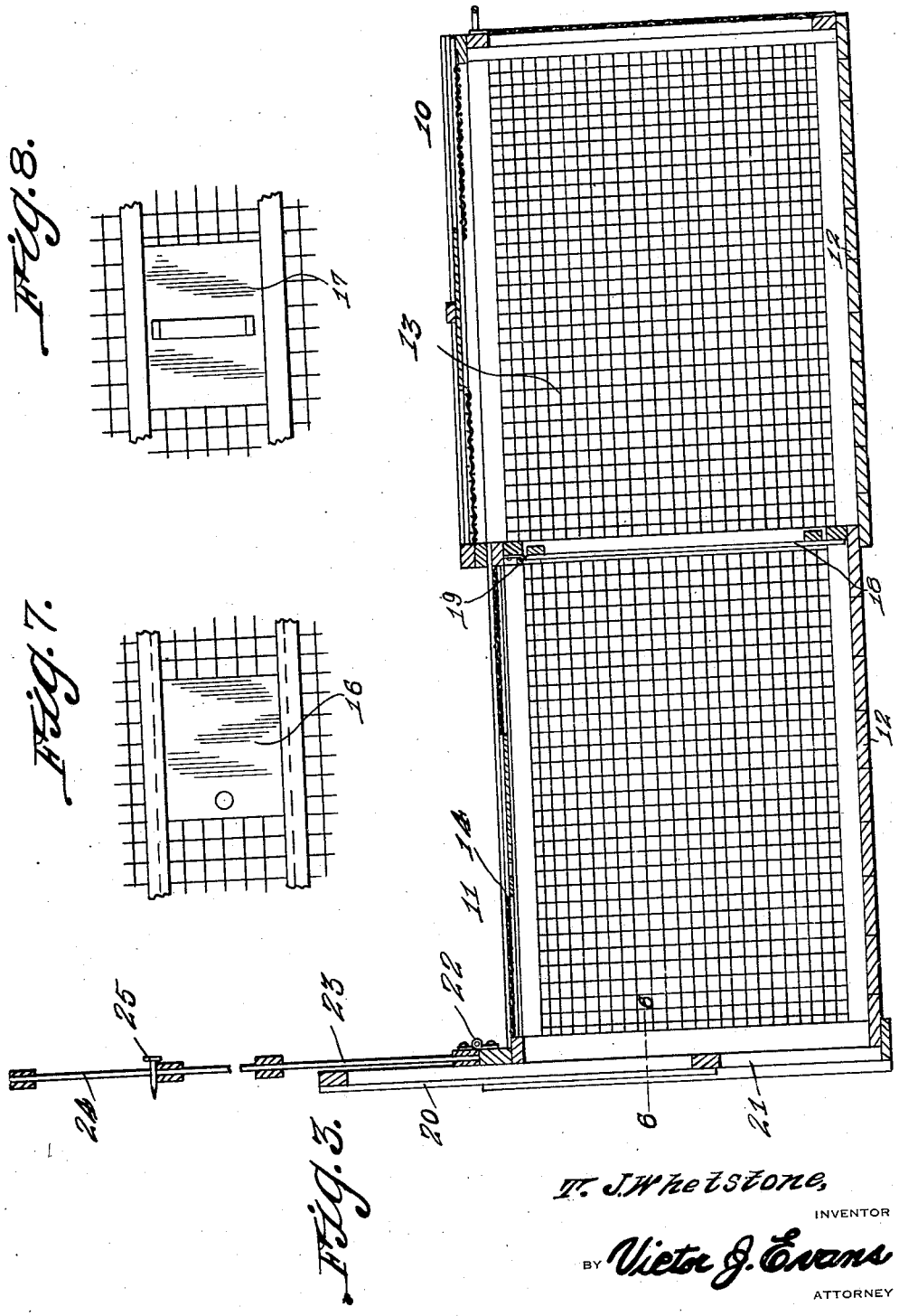

Patented May 20, 1930

1,759,770

UNITED STATES PATENT OFFICE

TRIMBLE J. WHETSTONE, OF HUTCHINSON, KANSAS

POULTRY TRAP

Application filed May 28, 1928. Serial No. 281,235.

This invention relates to traps especially designed for catching poultry and is useful in culling poultry, in separating chickens of a flock, and for selecting chickens to be sold, in addition to breaking up setting hens. While the invention is especially designed for the purposes stated, it is also useful for trapping pigeons, and may be made in suitable sizes and of suitable materials and used in the transfer of animals from one place to another.

An object of the invention is the provision of a trap of the above character which may be adjusted to increase or reduce its size, and may be divided into separate compartments to separate its contents.

Another object of the invention is the provision of a barrier which is connected with the trap for the purpose of assisting in closing an opening, so that the trap may be placed within the doorway of a building and the poultry, etc., will be obliged to enter the trap when leaving the building.

With the above and other objects in view, the invention further includes the following novel features and details of construction, to be hereinafter more fully described, illustrated in the accompanying drawings and pointed out in the appended claims.

In the drawings:—

Figure 1 is a side elevation showing the trap collapsed and the barrier and door of the trap elevated.

Figure 2 is a front view of the same.

Figure 3 is a longitudinal sectional view with the trap extended and the barrier and door in the position shown in Figure 1.

Figure 4 is a longitudinal sectional view showing the trap collapsed and the barrier folded.

Figure 5 is a cross sectional view with the parts in the position shown in Figure 4.

Figure 6 is a section on the line 6—6 of Figure 3.

Figure 7 is a fragmentary top view showing the closure slide for the inner section.

Figure 8 is a similar view of the slide for the outer section.

Referring to the drawings in detail whereon in like characters of reference denote corresponding parts, the trap as illustrated comprises a reticulated container and includes an outer section 10 and an inner section 11, the latter telescoping within the former so that the trap may be collapsed as shown in Figure 1, or extended as shown in Figure 3. These sections 10 and 11 are made up of suitable frames having solid bottoms 12 and reticulated walls 13, their top walls having openings 14 therein which are normally closed by means of slides. The slide for the opening 14 of the section 11 is shown at 16, while the slide for the outer section 10 is shown at 17.

The section 10 is open at one end so as to slidingly receive the section 11 as previously stated, while the section 11 is provided with a closure 18 which is hingedly mounted as shown at 19 so as to be closed by gravity. This closure 18 divides the container into separate compartments when the sections are extended as shown in Figure 3.

The inner section 11 is provided at its outer end with a closure 20 which is mounted for vertical sliding movement within guides 21. This closure 20 may be formed of slats or bars, or in any other suitable manner.

Hingedly secured to the outer end of the inner section 11 at the top of said section and as indicated at 22, is a barrier 23. This barrier is of sectional formation and includes the inner hinged section which slidingly supports an outer section 24 so that the height of the barrier may be regulated.

The section 24 may be held in adjusted position by any suitable means, such for example as a pin or stud 25 which is removably positioned in any one of a number of openings 26 provided in the extension 24 and which is adapted to rest upon the upper edge of the hinged section.

In the use of the invention, the outer or entrance end of the trap is positioned within the doorway of a poultry house or other building and may be arranged either in collapsed position or extended position. The closure 20 is raised sufficiently to permit the poultry to enter the trap, while the barrier 23 is swung upward and its height adjusted to close the remaining portion of the doorway. The barrier is held in raised position and the closure 20 held against downward movement by means of a chain or other suitable connection 27 between the barrier and closure 20. One of these elements therefore acts as a support for the other.

The container may be provided with suitable handles 28 for convenience in handling.

The invention is susceptible of various changes in its form, proportions and minor details of construction and the right is herein reserved to make such changes as properly fall within the scope of the appended claims.

Having described the invention what is claimed is:

1. In a trap, a reticulated container comprising an outer section open at one end, an inner section slidable within the outer section, a hinged closure for the inner end of the inner section to divide the trap into separate compartments and a slidingly mounted closure for the outer end of the inner section.

2. In a trap, a reticulated container open at one end and adapted to have its open end positioned within the doorway of a building to provide communication between the building and container, a vertically slidable closure for the open end of the container, a barrier secured to the container and capable of being moved from a horizontal to a vertical position to close the upper part of the doorway, and means to connect the barrier and sliding closure to hold the latter in open position and the former in vertical position.

3. In a trap, a reticulated container open at one end and adapted to have its open end positioned within the doorway of a building to provide communication between the building and container, a vertically slidable closure for the open end of the container, an extensible barrier secured to the container and capable of being moved from a horizontal to a vertical position to close the upper part of the doorway, means to connect the barrier and sliding closure to hold the latter in open position and the former in vertical position, and means to hold the barrier in extended position 4. In a trap, a reticulated container comprising an outer section open at one end, an inner section slidable within the outer section, a hinged closure for the inner end of the inner section to divide the trap into separate compartments, a slidingly mounted closure for the outer end of the inner section, an extensible barrier hingedly secured to the outer end of the inner section and movable to a vertical or horizontal position, and means to adjust the height of the barrier to provide a relatively high barrier or to conform to the length of the container when the sections are collapsed.

In testimony whereof I affix my signature.

TRIMBLE J. WHETSTONE.